United States Patent
Kaneko

(10) Patent No.: US 11,579,829 B2
(45) Date of Patent: Feb. 14, 2023

(54) IMAGE FORMING APPARATUS, CONTROL METHOD, AND STORAGE MEDIUM

(71) Applicant: CANON KABUSHIKI KAISHA, Tokyo (JP)

(72) Inventor: Takayuki Kaneko, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/517,940

(22) Filed: Nov. 3, 2021

(65) Prior Publication Data
US 2022/0147293 A1 May 12, 2022

(30) Foreign Application Priority Data
Nov. 6, 2020 (JP) .............................. JP2020-186100

(51) Int. Cl.
*G06F 3/12* (2006.01)
(52) U.S. Cl.
CPC .......... *G06F 3/1267* (2013.01); *G06F 3/1204* (2013.01); *G06F 3/1253* (2013.01)
(58) Field of Classification Search
None
See application file for complete search history.

(56) References Cited

U.S. PATENT DOCUMENTS

| | | | | |
|---|---|---|---|---|
| 2011/0317215 A1* | 12/2011 | Ida | .................. | G06F 3/1288 |
| | | | | 358/1.15 |
| 2016/0004492 A1* | 1/2016 | Lin | .................. | G06F 3/1239 |
| | | | | 358/1.13 |
| 2019/0012118 A1* | 1/2019 | Nakajima | ............. | G06F 3/1204 |

FOREIGN PATENT DOCUMENTS

JP      2018129676 A      8/2018

* cited by examiner

*Primary Examiner* — Frantz Bataille
(74) *Attorney, Agent, or Firm* — Canon U.S.A., Inc. IP Division

(57) ABSTRACT

An image forming apparatus includes an operation device, one or more memories, and one or more processors that execute a set of instructions to receive a print job from an information processing apparatus, store the received print job in the one or more memories, control the operation device to display a list of print jobs stored in the one or more memories, register a print job included in the list in the image forming apparatus, based on a user instruction received by the operation device, and display an execution button for executing the registered print job in a function selection screen.

9 Claims, 24 Drawing Sheets

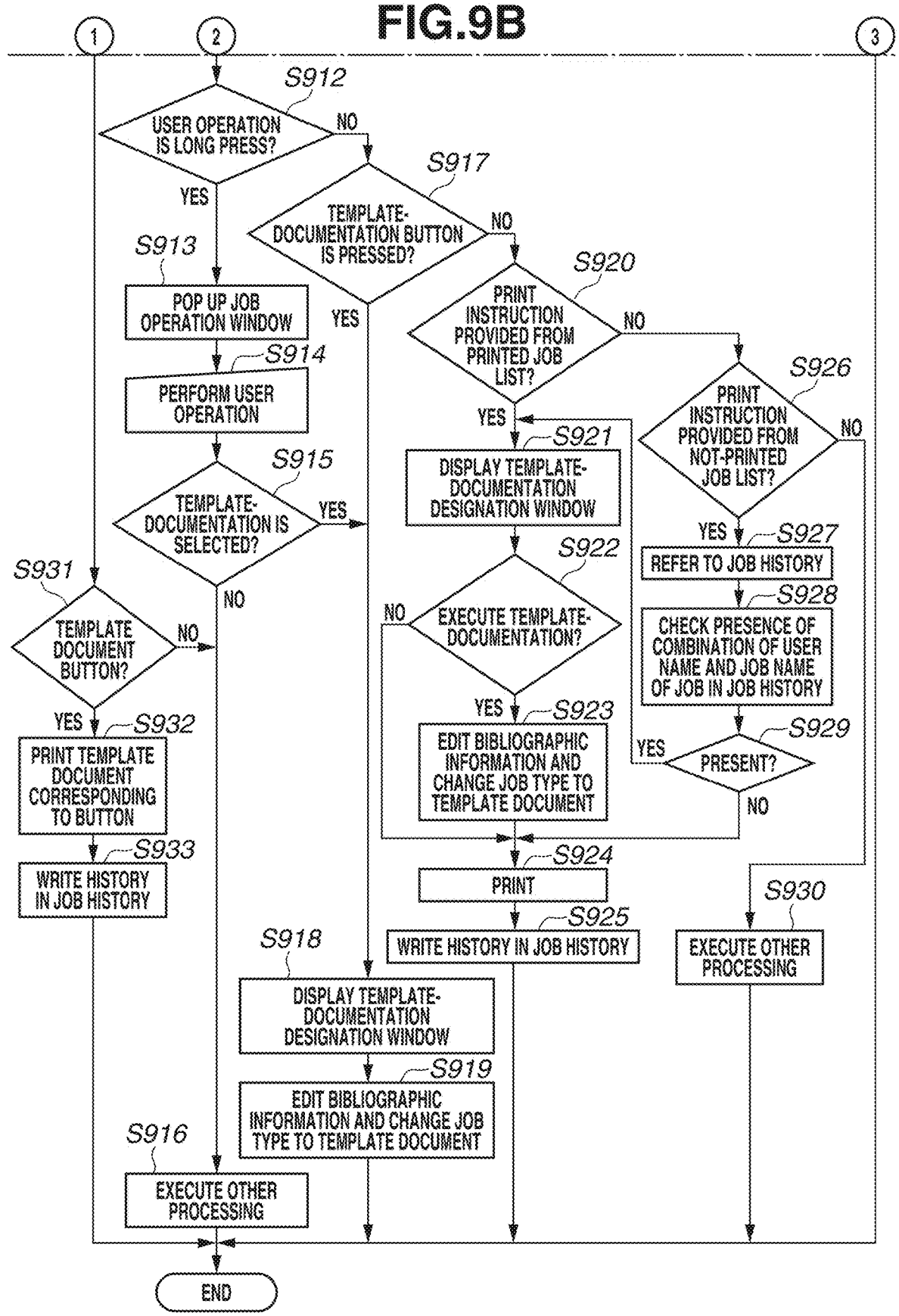

FIG.12

*1200* USER AUTHENTICATION SCREEN

ENTER USER ID AND PASSWORD AND LOG IN.
MAKE SURE TO LOG OUT AFTER COMPLETING OPERATION.

USER ID  | Kaneko | ~ *1201*

PASSWORD | * * * * | ~ *1202*

*1203*  *1204*
[ CLEAR ]  [ LOGIN ]

FIG.15

*1500* JOB OPERATION WINDOW

| NOT PRINTED | PRINTED |
|---|---|
| DATA/TIME | JOB NAME |
| 2017/06/0 | |
| 2017/06/0 | |
| 2017/06/0 | |

TEMPLATE DOCUMENTATION — 1501

OTHERS — 1502

1503

DELETE        PRINT

FIG.18

*1800* JOB HISTORY

| PRINT DATE/TIME | USER ID | PRINT JOB NAME |
|---|---|---|
| 2017/06/03 9:00 | Kaneko | AAA |
| 2017/06/03 9:05 | Sato | BBB |
| 2017/06/03 10:00 | Kaneko | CCC |
| 2017/06/03 10:00 | Kaneko | DDD |
| 2017/06/03 11:00 | Suzuki | EEE |
| 2017/06/03 12:00 | Suzuki | FFF |

TEMPLATE DOCUMENT PRINT

MANAGEMENT OF REGISTERED INFORMATION

2000 TEMPLATE DOCUMENT MANAGEMENT PAGE

[NEW REGISTRATION] ~2001

| TEMPLATE DOCUMENT NAME | SIZE | |
|---|---|---|
| TEMPLATE DOCUMENT 1 | 1 MB | [DELETE] |
| TEMPLATE DOCUMENT 2 | 1.5 MB | [DELETE] |
| TEMPLATE DOCUMENT 3 | 0.7 MB | [DELETE] |

TEMPLATE-DOCUMENT NEW REGISTRATION SCREEN 2100

| TEMPLATE DOCUMENT PRINT |
|---|

TEMPLATE DOCUMENT PRINT > NEW REGISTRATION  2102

2101 — [ OK ]   [ CANCEL ]

DETAILED INFORMATION ABOUT BUTTON

BASIC SETTINGS

TEMPLATE DOCUMENT NAME: [                    ] — 2103

(UP TO 20 CHARACTERS)

FILE PATH: [                    ] — 2104

PRINT SETTINGS

NUMBER OF COPIES: [ 1 ]  (1 – 9999)

2105

TWO-SIDED PRINTING

☐ EXECUTE TWO-SIDED PRINTING

2106

COLOR SETTING

COLOR MODE: [ AUTOMATIC (COLOR/MONOCHROME) ▽ ]

2300 HELD JOB LIST

| RECEIVING DATE AND TIME ~2301 | USER ID ~2302 | PRINT JOB NAME ~2303 | JOB TYPE ~2304 | SHARE FLAG ~2305 | PRINT SETTINGS ~2306 | TEMPLATE DOCUMENT NAME ~2307 | STORAGE LOCATION ~2308 |
|---|---|---|---|---|---|---|---|
| 2017/06/03 9:00 | Kaneko | AAA | HELD | OFF | NUMBER OF COPIES = 1<br>TWO-SIDED = ON<br>COLOR MODE = AUTOMATIC | (NULL) | /data/Kaneko/doc1 |
| 2017/06/03 9:05 | Sato | BBB | HELD | OFF | NUMBER OF COPIES = 1<br>TWO-SIDED = ON<br>COLOR MODE = AUTOMATIC | (NULL) | /data/Sato/doc1 |
| 2017/06/03 10:00 | Kaneko | CCC | TEMPLATE DOCUMENT | OFF | NUMBER OF COPIES = 1<br>TWO-SIDED = OFF<br>COLOR MODE = AUTOMATIC | TEMPLATE DOCUMENT 1 | /data/Kaneko/doc2 |
| 2017/06/03 10:00 | Kaneko | DDD | TEMPLATE DOCUMENT | OFF | NUMBER OF COPIES = 1<br>TWO-SIDED = OFF<br>COLOR MODE = AUTOMATIC | TEMPLATE DOCUMENT 2 | /data/Kaneko/doc3 |
| 2017/06/03 11:00 | Suzuki | EEE | TEMPLATE DOCUMENT | ON | NUMBER OF COPIES = 1<br>TWO-SIDED = OFF<br>COLOR MODE = AUTOMATIC | TEMPLATE DOCUMENT 3 | /data/Suzuki/doc1 |
| 2017/06/03 12:00 | Suzuki | FFF | HELD | OFF | NUMBER OF COPIES = 1<br>TWO-SIDED = ON<br>COLOR MODE = AUTOMATIC | (NULL) | /data/Suzuki/doc2 |

IMAGE FORMING APPARATUS, CONTROL METHOD, AND STORAGE MEDIUM

BACKGROUND

Field of the Disclosure

The present disclosure relates to an image forming apparatus, a control method, and a storage medium for receiving a print job from an information processing apparatus and storing the received print job in a storage unit.

Description of the Related Art

There is an image forming apparatus having a function called hold printing for the purpose of security. The image forming apparatus temporarily stores a print job received from outside as a held job in a hard disk in the image forming apparatus, without immediately outputting the received print job. The image forming apparatus displays a held job list of a user on an operation unit, after the user logs in. The user selects a desired job from the displayed list and provides a print instruction. The image forming apparatus prints the selected held job, and deletes the data of the job after the print is performed.

Japanese Patent Application Laid-Open No. 2018-129676 discusses a template document printing function for registering image data to be frequently printed by a user in an image forming apparatus as a template document, calling the template document using a button displayed in a home screen, and printing the template document. The image data registered as the template document remains stored without being deleted from a storage device in the image forming apparatus even after the print is performed. In Japanese Patent Application Laid-Open No. 2018-129676, the user operates a personal computer (PC) to register the template document.

In Japanese Patent Application Laid-Open No. 2018-129676 described above, the user has to operate the PC to register a document to be frequently printed in the image forming apparatus. Here, in a case where, when the user provides an instruction to execute a print job with an operation unit of the image forming apparatus after transmitting the print job from the PC to the image forming apparatus, the user wants to perform an operation for registering the print job, the user has to return to the PC to perform a document registration operation, which is inconvenient for the user.

SUMMARY

Embodiments of the present disclosure enable a user to perform a registration operation with an operation device of an image forming apparatus. According to embodiments of the present disclosure, an image forming apparatus includes an operation device, one or more memories, and one or more processors that execute a set of instructions to receive a print job from an information processing apparatus, store the received print job in the one or more memories, control the operation device to display a list of print jobs stored in the one or more memories, register a print job included in the list in the image forming apparatus, based on a user instruction received by the operation device, and display an execution button for executing the registered print job in a function selection screen.

Further features of the present disclosure will become apparent from the following description of exemplary embodiments with reference to the attached drawings.

BRIEF DESCRIPTION OF THE DRAWINGS

FIGS. 9A and 9B illustrate print processing for a template document and a held job in the image forming apparatus.
FIG. 12 illustrates an example of a user authentication screen of the image forming apparatus.
FIG. 15 illustrates an example of a job operation window of the image forming apparatus.
FIG. 18 illustrates an example of a job history,
FIG. 20 illustrates an example of a template document management page provided by the image forming apparatus.
FIG. 21 illustrates an example of a template-document new registration screen provided by the image forming apparatus,
FIG. 23 illustrates an example of a held job list.

DESCRIPTION OF THE EMBODIMENTS

An exemplary embodiment of the present disclosure will be described below with reference to the accompanying drawings.

In the present exemplary embodiment, a job controlling method for hold printing and a job controlling method for template document printing in an image forming apparatus will be described. In particular, a method of changing a held print job retained in the image forming apparatus to a template document will be described. In the present exemplary embodiment, the template document is a document registered in the image forming apparatus. The document registered in the image forming apparatus as the template document is excluded from targets for automatic deletion of print jobs stored in the image forming apparatus. Further, a button for executing printing of the document registered in the image forming apparatus as the template document is displayed in the home screen displayed when a user logs into the image forming apparatus.

Figure 1:
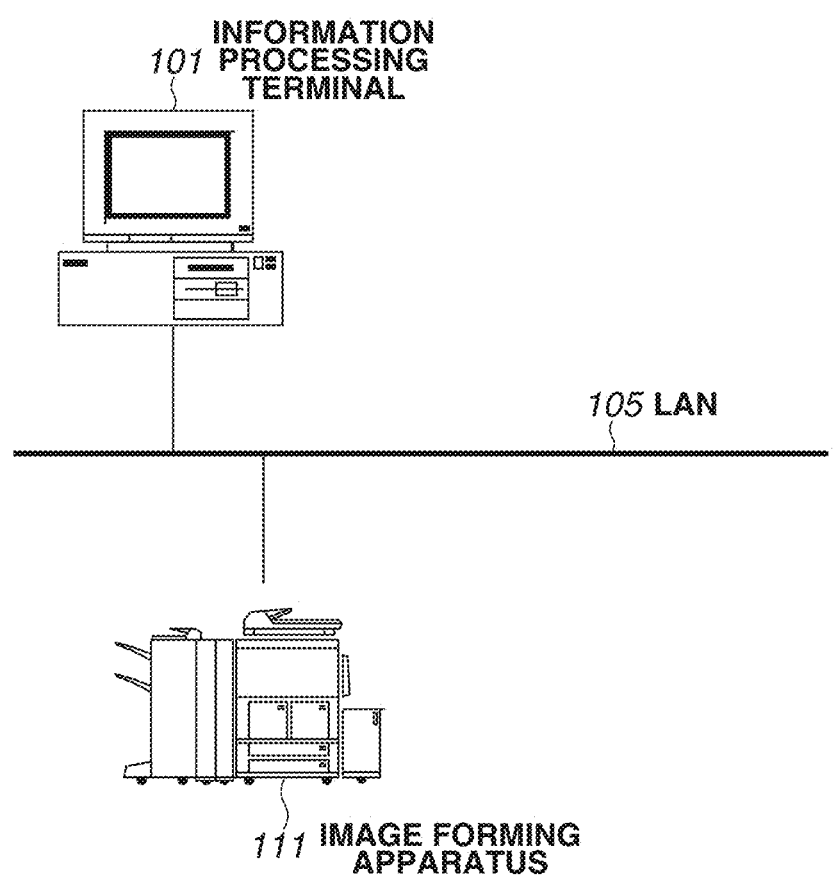
FIG. 1 is a diagram illustrating a system configuration.

FIG. 1 illustrates a configuration example of a print system. In FIG. 1, an information processing terminal 101 can be connected to a network (a local area network (LAN) 105). An image forming apparatus 111 can print a print job received from the information processing terminal 101.

Figure 2:
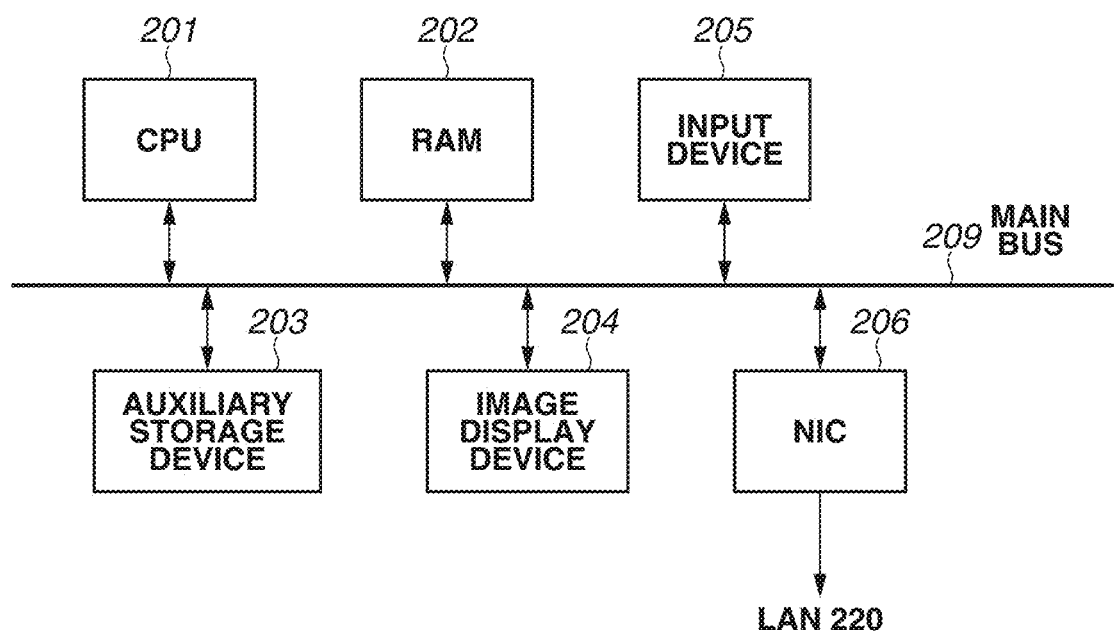
FIG. 2 is a diagram illustrating an internal configuration of an information processing terminal.

FIG. 2 illustrates an example of an internal configuration of a typical information processing terminal, and illustrates, specifically, an internal configuration of the information processing terminal 101 in FIG. 1. A central processing unit (CPU) 201 performs information processing when executing control in the present exemplary embodiment. A random access memory (RAM) 202 provides a work area of the CPU 201. An auxiliary storage device 203 (such as a hard disk or a compact disc read only memory (CD-ROM)) provides a control program in the present exemplary embodiment. An image display device 204 (specifically, a cathode-ray tube (CRT) display or a liquid crystal display) is used to notify a user of a message. An input device 205 (specifically, a mouse or a keyboard) is used for inputting a command of the user. A network interface card (NIC) 206 is used for exchanging data with other network devices via a LAN 220. Further, a main bus 209 is provided.

Figure 3:
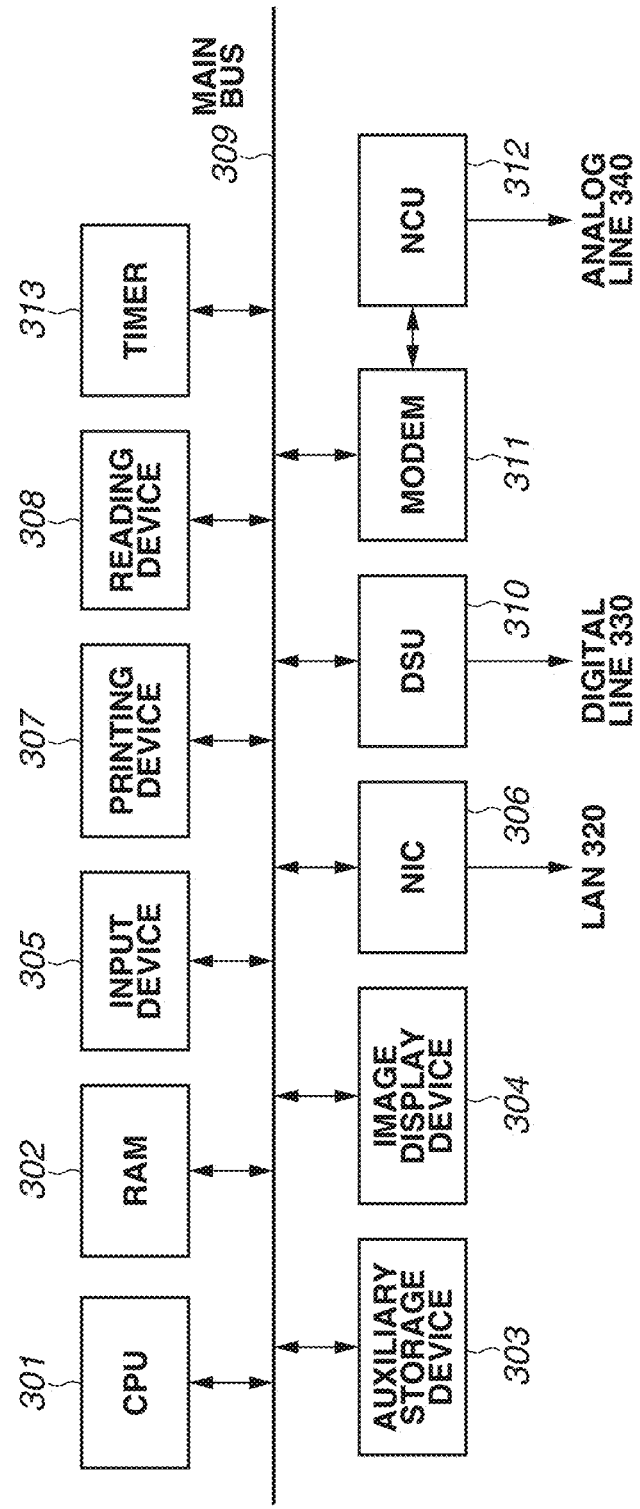
FIG. 3 is a diagram illustrating an internal configuration of an image forming apparatus.

FIG. 3 illustrates an example of an internal configuration of the image for apparatus (the image forming apparatus 111). In FIG. 3, a CPU 301 performs information processing in controlling the image forming apparatus. A RAM 302 is a memory for providing a work area of the CPU 301 and temporarily storing data. An auxiliary storage device 303 (such as a hard disk or a CD-ROM) is used to temporarily store data and used in place of the RAM 302. A print job received from an information processing apparatus (the information processing terminal 101) is saved in the auxiliary storage device 303 serving as a storage unit of the image forming apparatus. An image display device 304 is, for example, a touch panel, and functions as an operation unit used in displaying information, such as a state of the image forming apparatus and an error message. An input device 305 (such as a touch panel) is a device for inputting a command of a user, and provided for the user to operate to, for example, designate a desired print job. An NIC 306 is used for exchanging data with other network devices via a LAN 320. A printing device 307 is a device for printing data, such as scanned image data, on a sheet. A reading device 308 (scanner) scans a paper document placed on a platen glass, and generates image data, such as monochrome binary image data or color multi-value image data. The image data generated by scanning can be printed by the printing device 307, and can also be held in the auxiliary storage device 303 to be printed as any time. A digital service unit (DSU) 310 is connected to a digital line 330 and provided to be used for data transmission and reception. A network control unit (NCU) 312 is connected to an analog line 340, and provided to perform opening/closing of the line, transmission/reception control, transmission/reception of image data (analog), and the like. A modem 311 modulates/demodulates transmitted/received data. A timer 313 manages the time and is used to determine, for example, the time when a held print job with an expired retention period is deleted. Further, a main bus 309 is provided.

Figure 4:
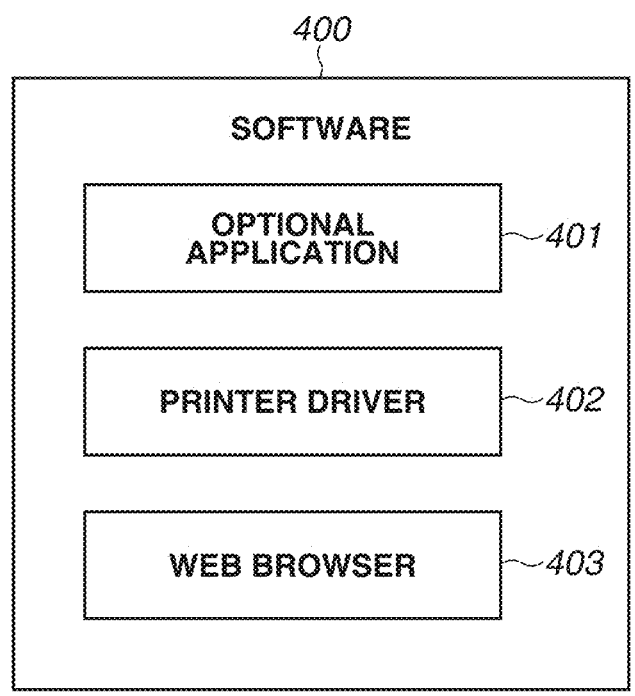
FIG. 4 is a module diagram of a control program of the information processing terminal.
Figure 5:
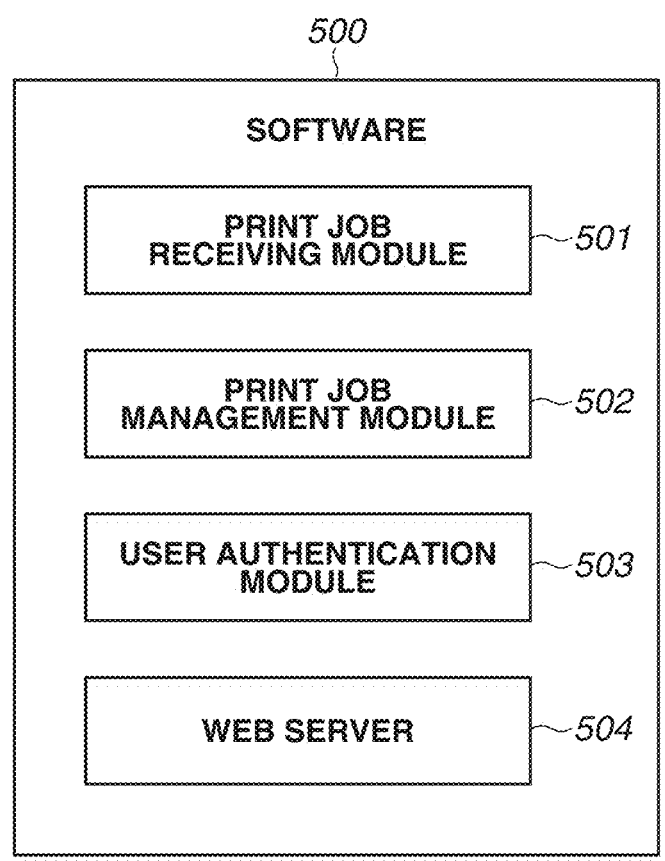
FIG. 5 is a module diagram of a control program of the image forming apparatus.

FIG. 4 illustrates an example of software (software 400) related to the present exemplary embodiment, and stored in the auxiliary storage device 203 of the information processing terminal 101. An optional application 401 is an optional rendering application, such as a text editor. A printer driver 402 generates a print job that can be interpreted by the image forming apparatus 111 based on an instruction from the optional application 401, and transmits the generated print job to the image forming apparatus 111. A web browser 403 is used to display a website and to use a service. The CPU 201 reads out the optional application 401, the printer driver 402, and the web browser 403 from the auxiliary storage device 203 into the RAM 202 to execute these pieces of software, FIG. 5 illustrates an example of software (software 500) which relates to the present exemplary embodiment and is stored in the auxiliary storage device 303 of the image forming apparatus 111. The CPU 301 reads out control modules 501 to 504, specifically, a print job receiving module 501, a print job management module 502, a user authentication module 503, and a web server 504, from the auxiliary storage device 303 into the RAM 302 to execute these.

The print job receiving module 501 is used for receiving a print job 2200 from the information processing terminal 101 using the NIC 306 and sending the print job 2200 to the print job management module 502. The print job management module 502 is used to analyze the print job 2200 input from the information processing terminal 101, and print the print job 2200 stored in the auxiliary storage device 303, using the printing device 307. The user authentication module 503 is used for identifying a user using the image forming apparatus 111. The web server 504 is used for providing information and a function related to the image forming apparatus 111 to an information terminal on the Web.

Figure 6:
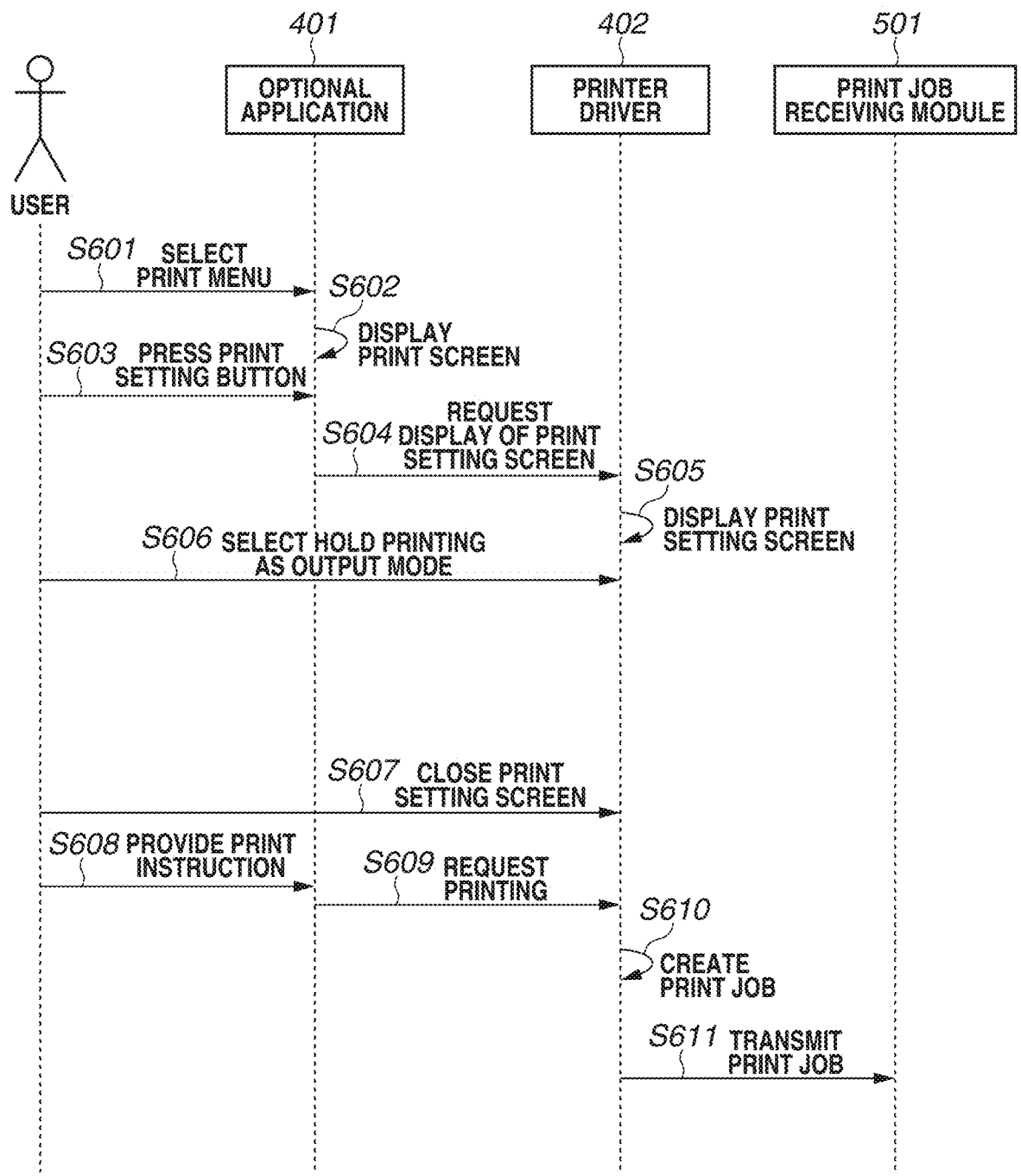
FIG. 6 illustrates print job generation processing in the information processing terminal.

FIG. 6 is a sequence diagram illustrating processing in which a user transmits a print job to the image forming apparatus 111, using the optional application 401 and the printer driver 402. In step S601, the user selects a print menu of the optional application 401 in a case where the user desires printing when using the optional application 401, such as a text editor. In step S602, when the print menu is selected by the user, the optional application 401 displays a print screen for selecting a printer to be used and designating print settings. In step S603, a button for the user to call the printer driver 402 (here, a print setting button) is pressed in the print screen. Subsequently, in step S604, the optional application 401 requests the printer driver 402 to display a print setting screen. In step S605, in response to the display of the print setting screen being requested in step S604, the printer driver 402 displays a printer driver screen 1100 (the print setting screen) illustrated in FIG. 11.

Figure 11:
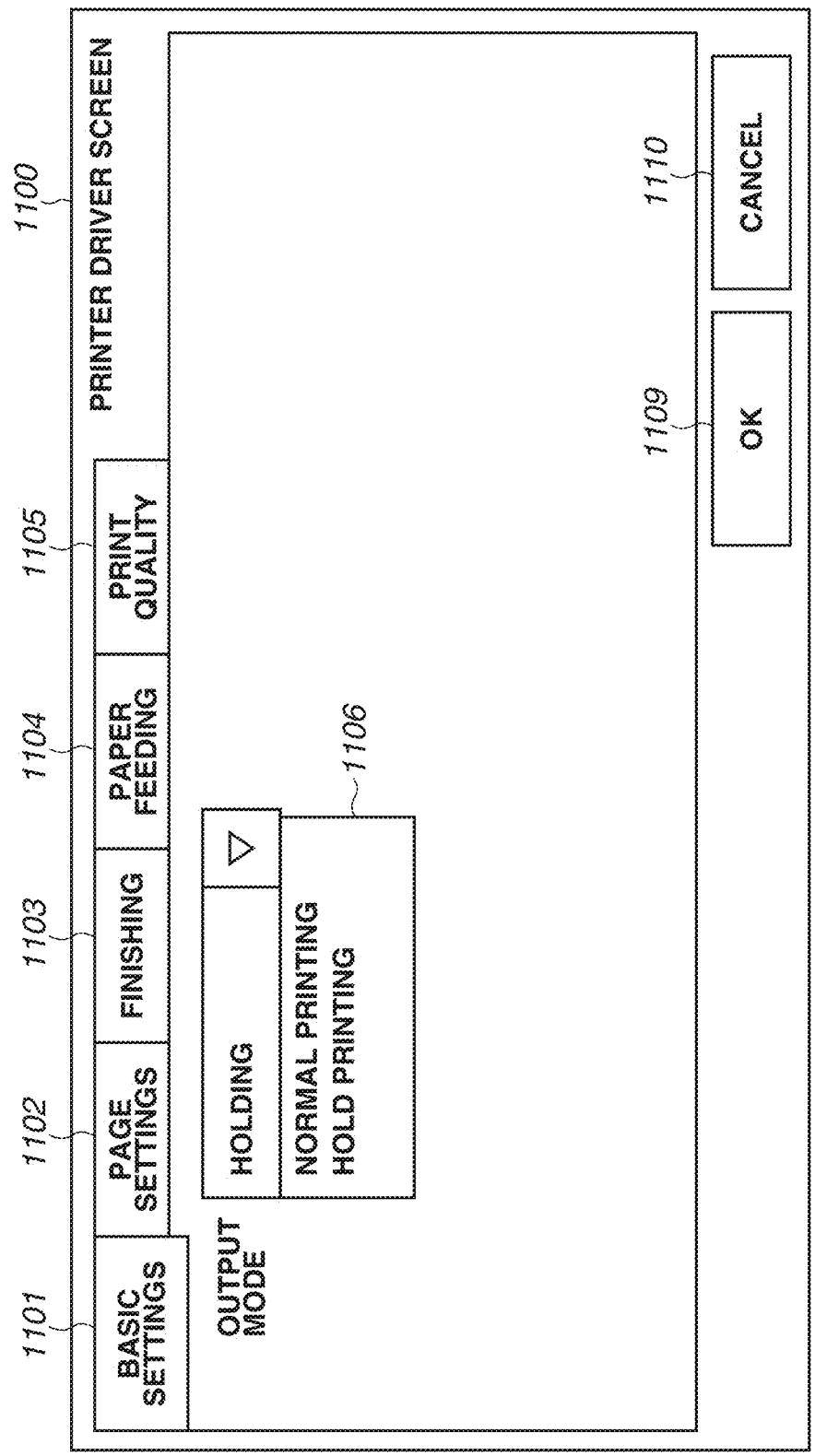
FIG. 11 illustrates an example of a print instruction screen of a printer driver.

FIG. 11 illustrates an example of the printer driver screen displayed by the printer driver 402 in the information processing terminal 101. An output mode 1106 is designated as a mode for processing a print job in the image forming apparatus 111. In the present exemplary embodiment, the user selects one of "normal printing" and "hold printing" as the output mode 1106. Other modes, such as "secure printing" or "box saving", can also be selected as the output mode 1106. In the present exemplary embodiment, designating "hold printing" as the output mode 1106 in the printer driver screen 1100 is described, but the way of holding the print job is not limited thereto. For example, the image forming apparatus may retain a setting for temporarily storing the received print job without immediately executing the print jot.

The user may be allowed to designate settings such as the number of copies, stapling, punching, paper feeding, resolution, and printing color, in menus 1102 to 1105 in the printer driver screen 1100. An OK button 1109 is used to determine various print settings designated in the printer driver screen 1100, and close the printer driver screen 1100. A cancel button 1110 is used to cancel various print settings designated in the printer driver screen 1100, and close the printer driver screen 1100. In step S606, the user selects the hold printing as the output mode 1106, in a case where the user desires the hold printing. In step S607, the user closes the printer driver screen 1100 (the print setting screen). In step S608, the user provides a print instruction in the print screen of the optional application 401. In step S609, in response to the print instruction, the optional application 401 requests the printer driver 402 to execute printing. In step S610, the printer driver 402 creates the print job 2200 in response to receiving the print request. In step S611, the printer driver 402 transmits the print job 2200 to the image forming apparatus 111 (specifically, the print job receiving module 501). Control of the image forming apparatus 111 in accordance with the output mode 1106 will be described below. The hold printing has been described to be designated as the output mode 1106 by the user in the printer driver in step S606, but the way of holding the print job in the image forming apparatus is not limited to this example. For example, the received print job may be held based on a setting in the main body of the image forming apparatus.

Figure 22:
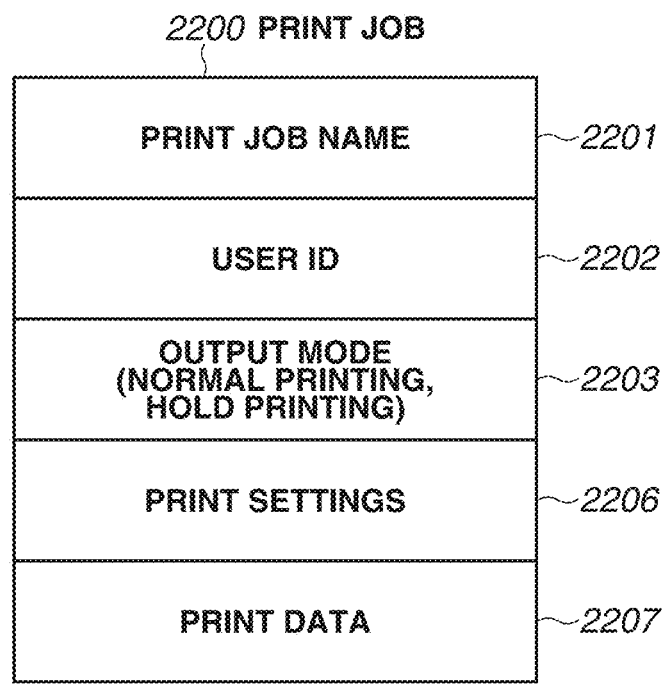
FIG. 22 illustrates a configuration example of a print job.

FIG. 22 illustrates an example of the print job (the print job 2200) generated by the printer driver 402. The print job 2200 includes at least print data, print settings information, and user information. Specifically, the print job 2200 includes a print job name 2201, a user identification (ID) 2202, an output mode 2203, print settings 2206, and print data 2207. The user ID 2202 is used to identify a user who is using the information processing terminal. The user ID 2202 may be explicitly designated by the user in the printer driver screen 1100. The output mode 2203 is designated by the user as the output mode 1106 in the printer driver screen 1100). The print settings 2206 include the number of copies, two-sided (one-sided printing or two-sided printing), and color mode (print color). The print data 2207 is designated by optional rendering software, such as a text editor.

Figure 8:
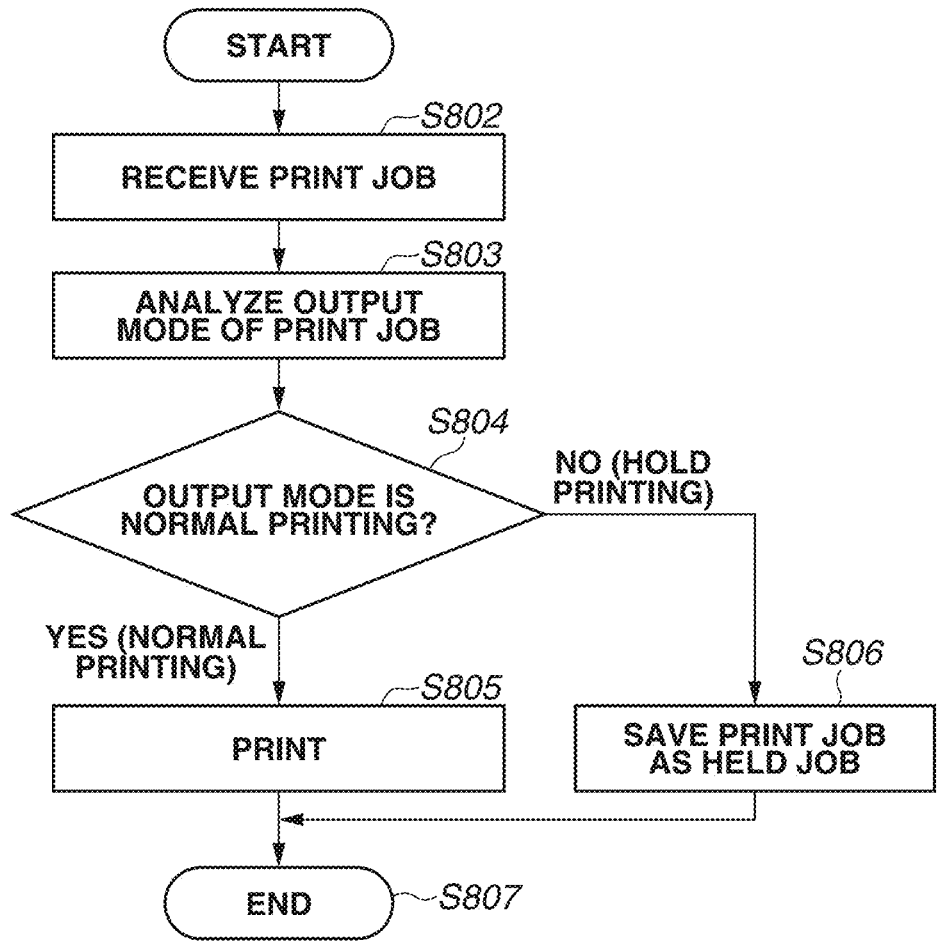
FIG. 8 illustrates print job receiving processing in the image forming apparatus.

FIG. 8 is a flowchart illustrating details of processing performed by the software 500 which operates in the image forming apparatus 111. In step S802, the print job receiving module 501 receives the print job 2200. In step S803, the print job management module 502 analyzes the output mode 2203 of the print job 2200, in step S804, the print job management module 502 determines whether the output mode 2203 is "normal printing". If the print job management module 502 determines that the output mode 2203 is "normal printing" (YES in step S804), the processing proceeds to step S805. In step S805, the print job management module 502 prints the print job 2200, using the printing device 307. If the print job management module 502 determines that the output mode 2203 is "hold printing" (NO in step S804), the processing proceeds to step S806. In step S806, the print job management module 502 saves the received print job 2200 as a held job, in association with the user information. To be more specific, the print job management module 502 saves the print job 2200 in the auxiliary storage device 303, and adds a job type 2304 of "held" to a held job list 2300 illustrated in FIG. 23, FIG. 23 illustrates a held job list (the held job list 2300) for managing a list of print jobs saved in the auxiliary storage device 303 by the print job management module 502. The held job list 2300 is managed in the auxiliary storage device 303 or the RAM 302, and the print job management module 502 can read and write information from and to the held job list 2300 at any time. The held job list 2300 includes a receiving date and time 2301 indicating the date and time when the print job 2200 is received by the print job receiving module 501. A user ID 2302 is the user ID 2202 included in the print job 2200. A print job name 2303 is the print job name 2201 included in the print job 2200. The job type 2304 is information indicating the type of the print job held in the auxiliary storage device 303. In a case where the print job 2200 is held as a held job, the print job management module 502 manages the job type 2304 as "held". The print job management module 502 manages the job type 2304 as "template document" for a template document to be described below. A share flag 2305 indicates whether the held job is a shared job. In a case where the share flag 2305 is OFF, the held job can be referred to and operated only when the user ID of a user logging into the image forming apparatus 111 matches the user ID 2302. In a case where the share flag 2305 is ON, all users logging into the image forming apparatus 111 are allowed to refer to and operate the held job. Moreover, in the case where the share flag 2305 is ON, a share range for the held job can be designated in the present exemplary embodiment. For example, the designation of a share range depending on the user ID, role, department, or group of the user may be enabled. If the job type 2304 is "template document" with the share flag 2305 ON and the logged-in user is included in the share range, an execution button for executing the template document is displayed in the home screen. In print settings 2306, descriptions of the print settings 2206 included in the print job 2200 are recorded. A template document name 2307 is the name of the template document to be described below. In the present exemplary embodiment, the template document name 2307 is always NULL in a case where the job type 2304 is "held". A storage location 2308 is a location where the print job 2200 saved in the auxiliary storage device 303 by the print job management module 502 is stored. The print job management module 502 can uniquely identify the print job 2200 saved in the auxiliary storage device 303 based on the storage location 2308.

Figure 7:
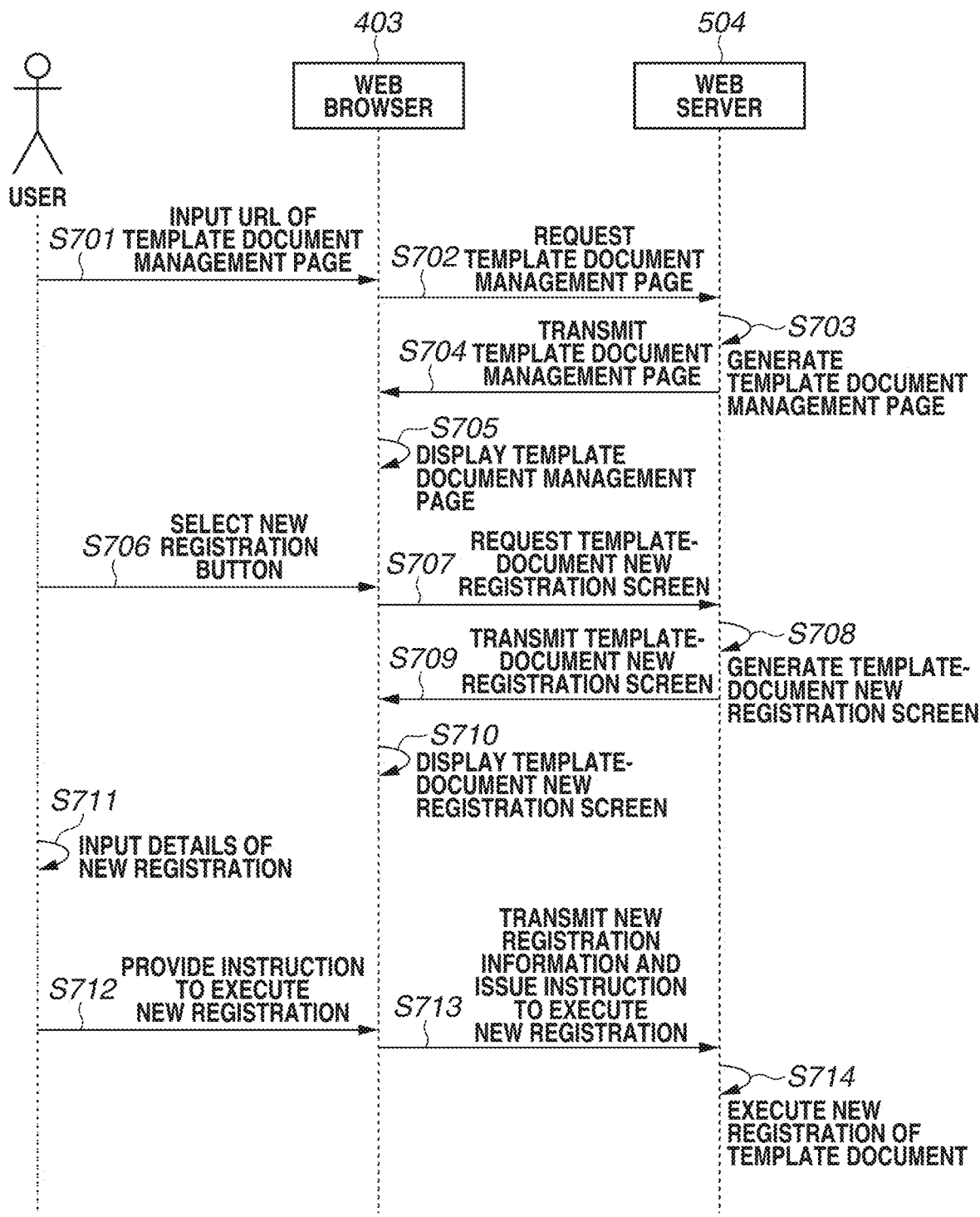
FIG. 7 illustrates template document registration processing in the information processing terminal.

FIG. 7 is a sequence diagram illustrating processing in which the user registers the template document in the image forming apparatus 111 from the web browser 403, using a service provided by the web server 504.

The image forming apparatus 111 has a template document printing function for registering a template document (image data) which is frequently printed by the user in the image forming apparatus 111, and calling the template document using a button displayed in the home screen to print the template document. In the present exemplary embodiment, the template document will be described as an example of a document to be registered in the image forming apparatus III, but the document to be registered in the image forming apparatus 111 is not limited to the template document and may have a different name.

In step S701, the user inputs the uniform resource locator (URL) of a template document management page provided by the web server 504 into the web browser 403. In step S702, the web browser 403 requests the web server 504 to provide the template document management page. In step S703, in response to the request for the template document management page from the web browser 403, the web server 504 generates the template document management page. In step S704, the web server 504 transmits the generated template document management page to the web browser 403. In step S705, in response to receiving the template document management page transmitted from the web server 504, the web browser 403 displays the template document management page to be described below with reference to FIG. 20. Subsequently, in step S706, the user selects a new registration button in the template document management page. In step S707, the web browser 403 then requests the web server 504 to provide a template-document new registration screen. In step S708, in response to receiving the request for provision of the template-document new registration screen, the web server 504 generates the template-document new registration screen. In step S709, the web server 504 transmits the generated template-document new registration screen to the web browser 403.

In step S710, in response to receiving the template-document new registration screen transmitted from the web server 504, the web browser 403 displays the template-document new registration screen 2100 to be described below with reference to FIG. 21. Next, in step S711, the user inputs details of new registration in the template-document new registration screen 2100. Subsequently, in step S712, the user instructs the web browser 403 to execute the new registration. In step S713, the web browser 403 transmits the new registration information to the web server 504, and instructs the web server 504 to execute the new registration. In step S714, in response to receiving the instruction to execute the new registration of the template document from the web browser 403, the web server 504 executes the new registration of the template document, based on the new registration information. In step S714, the web browser 403 stores data designated in an area 2104 of the template-document new registration screen 2100 into the auxiliary storage device 303, and adds "template document" for the job type 2304 in the held job list 2300. When adding the template document to the held job list 2300, the web server 504 registers the name of the template document designated in an area 2103 of the template-document new registration screen 2100, for the template document name 2307. When adding the template document to the held job list 2300, the web server 504 registers print settings designated in areas 2105 to 2107 of the template-document new registration screen 2100, in the print settings 2306. The information added to the held job list 2300 by the web server 504 can be referred to by the software 500 at any time.

FIG. 20 illustrates an example of the template document management page 2000 displayed in step S705. A new registration button 2001 is a control for displaying the template-document new registration screen to be used when a new template document is registered. A template document display area 2002 displays information about the registered template documents. An area 2003 includes delete buttons each provided to delete the registered template document. In the present exemplary embodiment, only the names of template documents and sizes thereof are displayed in the template document display area 2002, but other types of information, such as print settings, may be displayed. There may be a function of, for example, displaying a change screen when the name of a desired template document is clicked by the user in a case where the user wants to change the settings of the registered template document.

FIG. 21 illustrates an example of the template-document new registration screen 2100 displayed in step S710. The area 2103 is an input area for inputting the name of the template document to be newly registered. The area 2104 is an input area for designating the file path of data of the template document to be newly registered. The area 2105 is an input area for designating the number of copies in printing the template document in the image forming apparatus 111. The area 2106 is an input area for designating a two-sided printing attribute (an attribute indicating whether to perform two-sided printing) in printing the template document in the image forming apparatus 111. The area 2106 is an input area, specifically, a check box, and indicates two-sided printing when being checked, and one-sided printing when not being checked. The area 2107 is an input area for designating the color mode in printing the template document in the image forming apparatus 111. The area 2107 enables designation of any of automatic (color/monochrome), color, and monochrome, but the detailed description thereof will be omitted. An OK button 2101 is used to execute the new registration of the template document based on the descriptions designated in the areas 2103 to 2107. When the user presses the OK button 2101, the web browser 403 acquires the data corresponding to the template document, based on the file path input in the area 2104. Subsequently, the web browser 403 transmits the data corresponding to the template document to the web server 504 together with the print settings input in the areas 2105 to 2107, and instructs the web server 504 to execute the new registration of the template document. A cancel button 2102 is used to clear the descriptions designated in the template-document new registration screen 2100, and cancel the new registration of the template document.

Figure 9A:
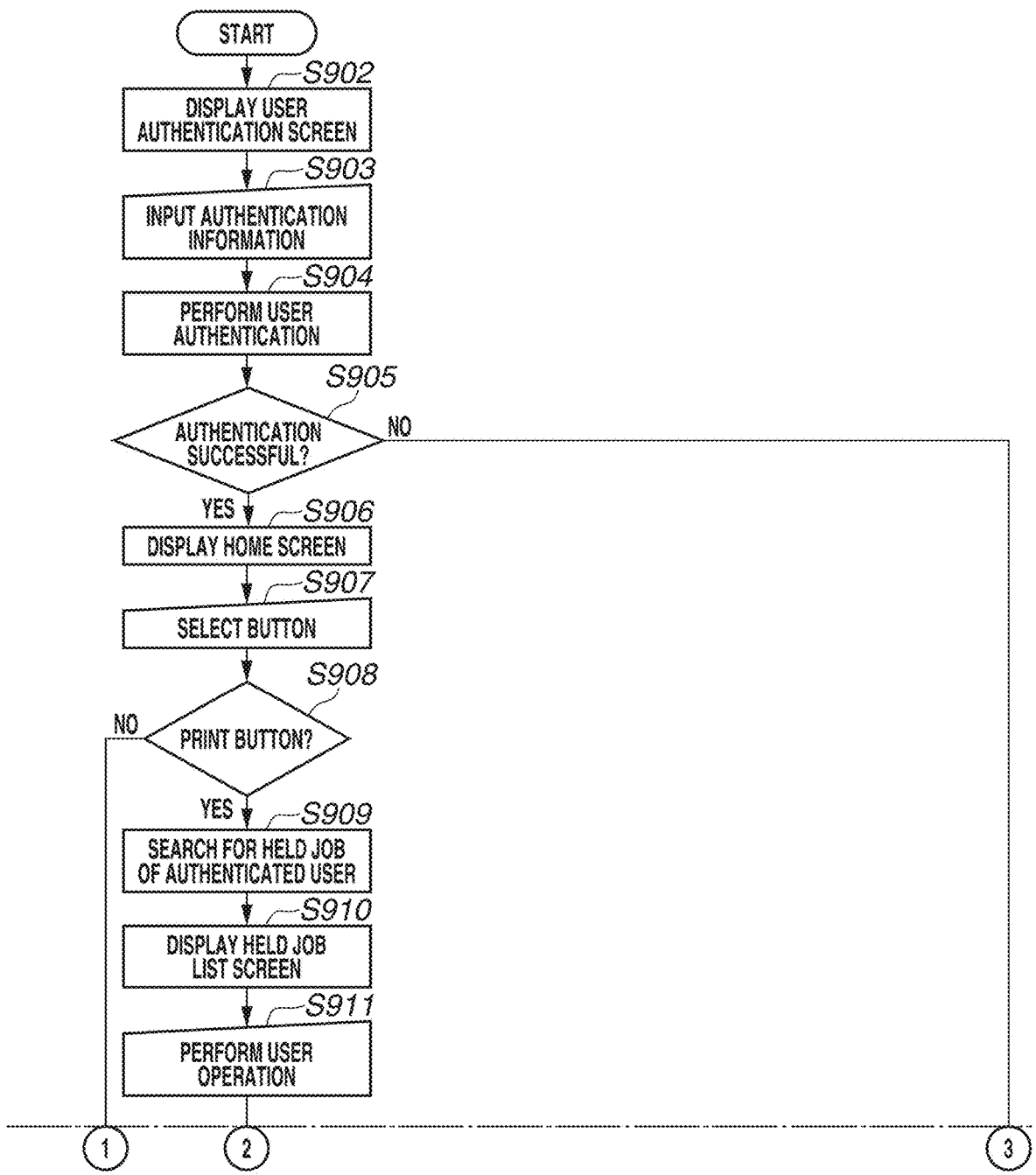
Figure 13:
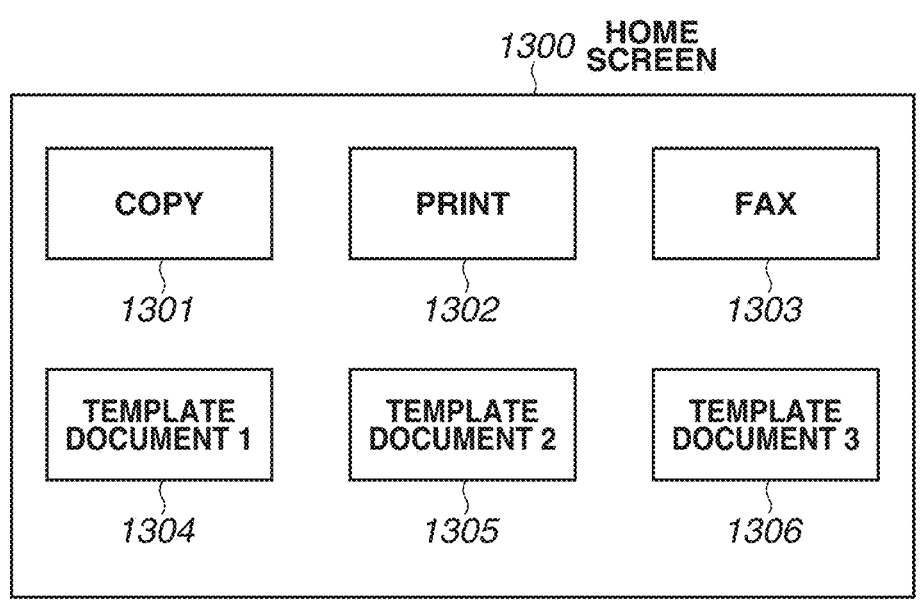
FIG. 13 illustrates an example of a home screen of the image forming apparatus.

FIGS. 9A and 9B are a flowchart illustrating processing of the image forming apparatus 111 performed based on operations by the login user. The processing here includes the execution of the print job stored in the auxiliary storage device 303 and the template document registration of the print job. In step S902, the user authentication module 503 displays a user authentication screen 1200 illustrated in FIG. 12 on the image display device 304. In the user authentication screen 1200, an area 1201 is used to input a user ID, and an area 1202 is used to input a password. A clear button 1203 is used for initializing the information input in the area 1201 and/or 1202. A login button 1204 is used for executing user authentication processing. In step S903, the user inputs the user ID and the password, and requests user authentication by pressing the login button 1204. Then, in step S904, the user authentication module 503 performs the user authentication processing. The details of the user authentication processing is not important in the present exemplary embodiment and thus will not be described. Afterward, the user ID processed in the user authentication processing in step S904 can be recognized by the print job management module 502 at any time. In step S905, the image forming apparatus 111 determines whether the user authentication is successful. If the user authentication is successful (YES in step S905), the processing proceeds to step S906. In step S906, the print job management module 502 displays a home screen 1300 illustrated in FIG. 13 on the image display device 304. If the user authentication in step S904 is determined to be unsuccessful (NO in step S905), the processing ends.

In the present exemplary embodiment, the home screen 1300 refers to a menu screen including a copy button 1301, a print button 1302, a fax button 1303, a template document button 1304 for a template document 1, a template document button 1305 for a template document 2, and a template document button 1306 for a template document 3. The copy button 1301 is a button to be selected by the user to use the copy function of the image forming apparatus 111. The print button 1302 is a button to be selected by the user to use the hold printing function. The fax button 1303 is a button to be selected by the user to use the fax function of the image forming apparatus 111. The template document button 1304 for the template document 1 is a button to be selected by the user to print the template document 1 in the image forming apparatus 111. The template document button 1305 for the template document 2 is a button to be selected by the user to print the template document 2 in the image forming apparatus 111. The template document button 1306 for the template document 3 is a button to be selected by the user to print the template document 3 in the image forming apparatus 111. The copy button 1301 and the fax button 1303 are not important in the present exemplary embodiment and thus will not be described in detail. When the user selects the print button 1302, the print job management module 502 displays a held job list screen 1400 and provides the user with the print function. The template document button 1304 for the template document 1, the template document button 1305 for the template document 2, and the template document button 1306 for the template document 3 are each used to print the registered held job as "template document" for the job type 2304 in the held job list 2300.

In step S907, the user selects a button in the home screen 1300. In step S908, the print job management module 502 checks whether the button selected by the user is the print button 1302. If the print job management module 502 determines that the button selected by the user is not the print button 1302 (NO in step S908), the processing proceeds to step S931. In step S931, the print job management module 502 checks whether the button selected by the user is any one of the template document buttons 1304 to 1306. If the print job management module 502 determines that the button selected by the user is any one of the template document buttons 1304 to 1306 (YES in step S931), the processing proceeds to step S932. In step S932, the print job management module 502 identifies the template document corresponding to the selected template document button in the held job list 2300, and prints the identified template document using the printing device 307. Subsequently, in step S933, the print job management module 502 writes the history of details of the printing performed in step S932 in a job history 1800, and the processing ends.

FIG. 18 illustrates an example of the job history 1800 managed by the print job management module 502. In the present exemplary embodiment, the job history 1800 includes a print date and time 1801, a user ID 1802, and a print job name 1803. In the print date and time 1801, the print date and time when printing is executed by the print job management module 502 is recorded. In the user ID 1802, the user ID of the user authenticated in step S904 is recorded. In the print job name 1803, the print job name managed in a field for the print job name 2303 of the held job list 2300 is recorded. The job history 1800 is stored in the auxiliary storage device 303 by the print job management module 502. The print job management module 502 can refer to or edit the job history 1800 at any time.

Figure 14:
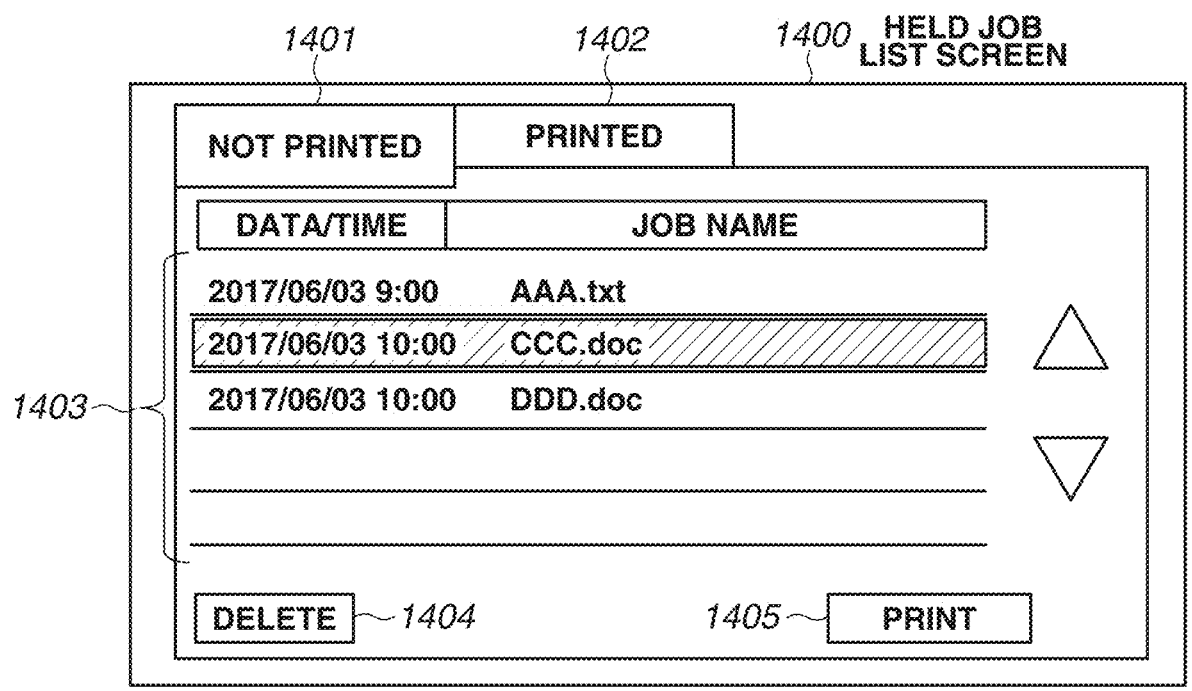
FIG. 14 illustrates an example of a held job list screen of the image forming apparatus.

If the print job management module 502 determines that the button selected by the user is the print button 1302 (YES in step S908), the processing proceeds to step S909. In step S909, the print job management module 502 searches for the held job of the authenticated user, by referring to the fields for the user ID 2302 and the job type 2304 of the held job list 2300. In step S910, in response to the held job of the authenticated user being found in step S909, the print job management module 502 displays the held job list screen 1400 illustrated in FIG. 14 on the image display device 304. In the held job list screen 1400, a list display window 1403 displays details of the held jobs in list form. A delete button 1404 is used for deleting the held job selected in the list display window 1403. A print button 1405 is used for printing the held job selected in the list display window 1403. In step S911, the user performs an operation for the print job in the held job list screen 1400. In step S912, the print job management module 502 determines whether the operation performed by the user in step S911 is a long press of the selected job. If the operation performed by the user is a long press of the selected job (YES in step S912), the processing proceeds to step S913. In step S913, the print job management module 502 pops up a job operation window 1500 illustrated in FIG. 15 on the image display device 304.

Figure 16:
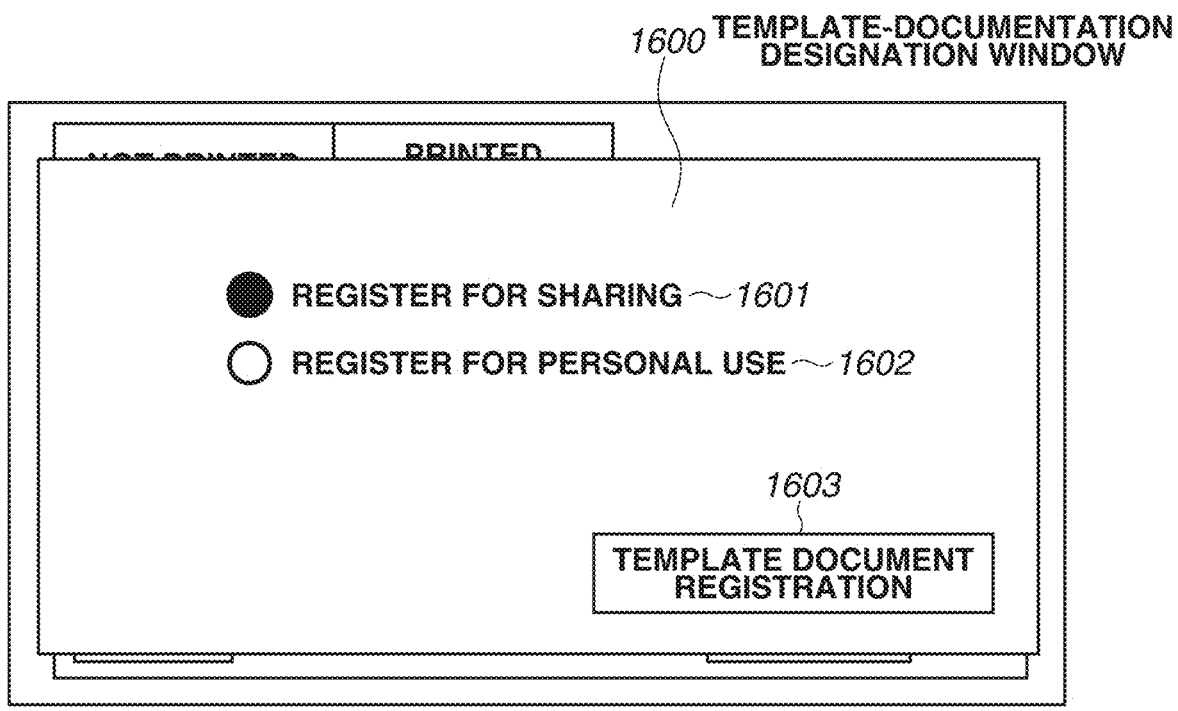
FIG. 16 illustrates an example of a template-documentation designation window of the image forming apparatus.
Figure 17:
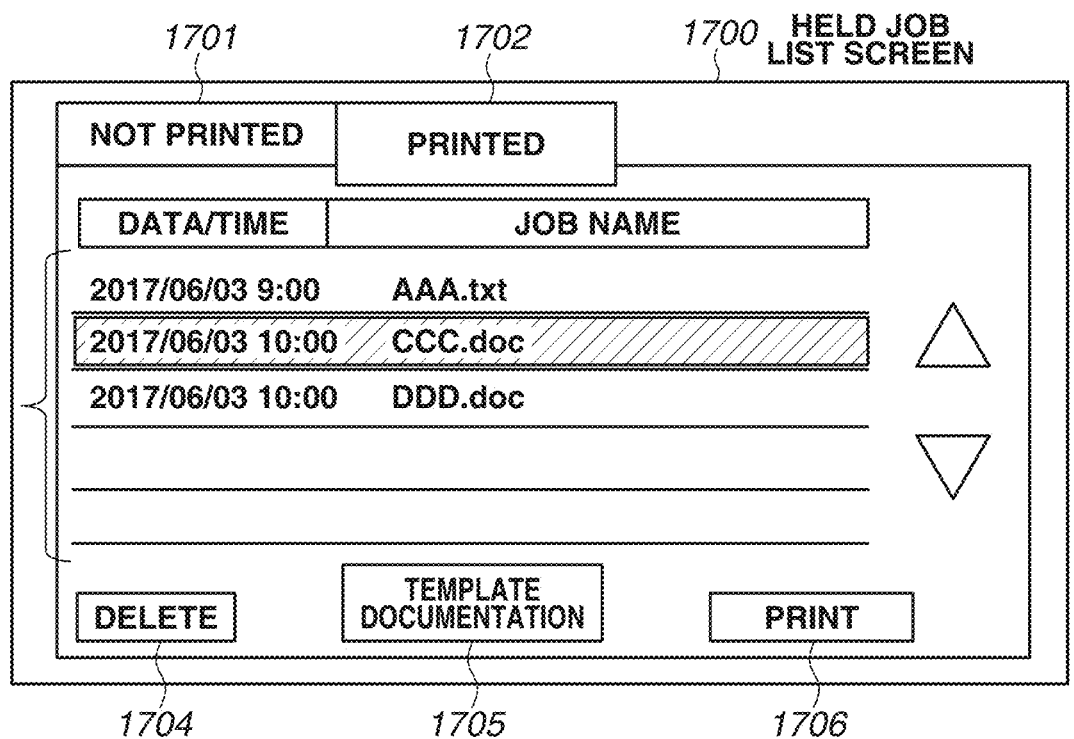
FIG. 17 illustrates an example of a held job list screen of the image forming apparatus.

The job operation window 1500 includes menus 1501 and 1502 used for the user to perform an operation for the job selected in the list display window 1403. The menu 1501 is used for changing the job type of the job selected in the list display window 1403 to the template document. The menu 1502 is used for selecting other options and will not be described in the present exemplary embodiment. In step S914, the user performs an operation in the job operation window 1500. In step S915, the print job management module 502 determines whether the operation performed by the user is the selection of the menu 1501 for change of the job type to the template document in the job operation window 1500. If the print job management module 502 determines that the operation performed by the user is the selection of the menu 1501 (YES in step S915), the processing proceeds to step S918. In step S918, the print job management module 502 displays a template-documentation designation window 1600 illustrated in FIG. 16 on the image display device 304. On the other hand, if the print job management module 502 determines that the user selects, on the job operation window 1500, not the menu 1501 for change of the job type to the template document but other menus (NO in step S915), the processing, proceeds to step S916 and other processing is performed in step S916. Meanwhile, if the operation performed by the user is not a long press of the selected job (NO in step S912), the processing proceeds to step S917. In step S917, the print job management module 502 determines whether a template-documentation button 1705 illustrated in FIG. 17 is pressed. If the template-documentation button 1705 is determined to be pressed (YES in step S917), the processing proceeds to step S918. In this case as well, in step S918, the print job management module 502 may display the template-documentation designation window 1600 illustrated in FIG. 16 on the image display device 304.

The template-documentation designation window 1600 includes an option 1601 for registering the template document as a document for sharing, and an option 1602 for registering the template document as a document for personal use in a case where the designated held job is registered as the template document. The template-documentation designation window 1600 further includes a template document registration button 1603 for providing an instruction to change the job type of the designated held job to the template document. The options 1601 and 1602 form a toggle, and the user can select only either one of these options. In step S919, when the user presses the template document registration button 1603, the print job management module 502 refers to the held job list 2300 and changes the job type 2304 of the corresponding job from "held" to "template document". In step S919, when the user presses the template document registration button 1603, the print job management module 502 writes the share flag 2305 of the held job list 2300 depending on the selected one of the options 1601 and 1602. If the user operation in step S911 is the press of the template-documentation button 1705 illustrated in FIG. 17, the print job management module 502 displays the above-described template-documentation designation window 1600 in step S918, and executes the above-processing processing in step S919. Subsequently, the processing ends.

Figure 19:
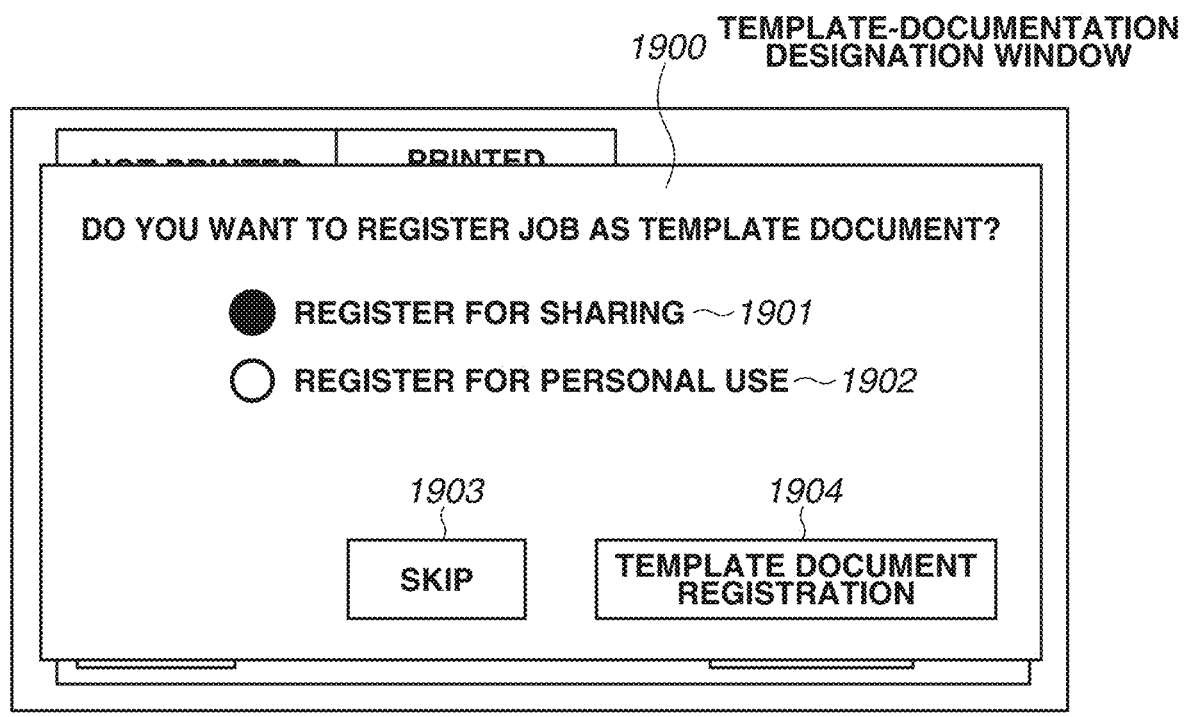
FIG. 19 illustrates an example of a template-documentation designation window of the image forming apparatus.

In the present exemplary embodiment, for the held printing, the hold printing includes two held job lists, specifically, a not-printed held job list 1701 and a printed held job list 1702. The not-printed held job list 1701 is displayed by the print job management module 502 in a case where the held job saved in step S806 has not yet been printed. The printed held job list 1702 is displayed by the print job management module 502 in a case where the held job saved in step S806 has already been executed once or more. In step S920, the print job management module 502 determines whether the print instruction is provided from the printed held job list 1702. If the print instruction is provided from the printed held job list 1702 (YES in step S920), the processing proceeds to step S921. In step S921, the print job management module 502 displays a template-documentation designation window 1900 illustrated in FIG. 19 on the image display device 304. The template-documentation button 1705 is a registration instruction button to register the held job as the template document. The template-documentation button 1705 is not displayed in the not-printed held job list 1701, but is displayed in the printed held job list 1702, and this is because it is conceivable that the user is likely to register a print job executed a plurality of times, as the template document. The template-documentation button 1705 can prompt the user to register a print job that the user is about to print again, as the template document. However, the not-printed held job list 1701 may be configured so that the template-documentation button 1705 is included.

If the user operation in step S911 is the press of a print button 1706 of the printed held job list 1702, the print job management module 502 displays the template-documentation designation window 1900 on the image display device 304 in step S921. The template-documentation designation window 1900 has about the same contents as those of the template-documentation designation window 1600, but includes a skip button 1903. In step S922, the print job management module 502 determines whether the template-documentation is to be executed. If the user presses the skip button 1903 in the template-documentation designation window 1900 (NO in step S922), the processing proceeds to step S924. In step S924, the print job management module 502 prints the held job using the printing device 307 without changing the job type of the held job to the template document. If the user presses a template document registration button 1904 in the template-documentation designation window 1900 (YES in step S922), the processing proceeds to step S923. In step S923, in a manner similar to step S919 described above, the print job management module 502 edits bibliographic information about the held job selected in a list display window 1703 and changes the job type to the template document. Whether to display the template-documentation designation window 1900 may be set when the print button 1706 is selected.

Next, in step S924, the print job management module 502 prints the job selected in the list display window 1703, using the printing device 307. Subsequently, in step S925, the print job management module 502 writes the history of the details of the printing performed in step S924 in the job history 1800, and the processing ends. In step S926, the print job management module 502 determines whether the user operation in step S911 is the press of the print button 1405 of a not-printed held job list 1401 in the held job list screen 1400. If the user operation in step S911 is the press of the print button 1405 (YES in step S926), the processing proceeds to step S927. In step S927, the print job management module 502 refers to the job history 1800. Subsequently, in step S928, the print job management module 502 checks the presence of the combination of the user name and the job name of the job to be executed in the job history. In step S929, the print job management module 502 determines whether such a combination is present. If the print job management module 502 determines that such a combination is present (YES in step S929), the print job management module 502 executes the operation in step S921 described above. If the print job management module 502 determines that the combination of the user name and the job name of the job to be executed is not present in the job history (NO in step S929), the print job management module 502 executes the processing in step S924 described above.

Figure 10:
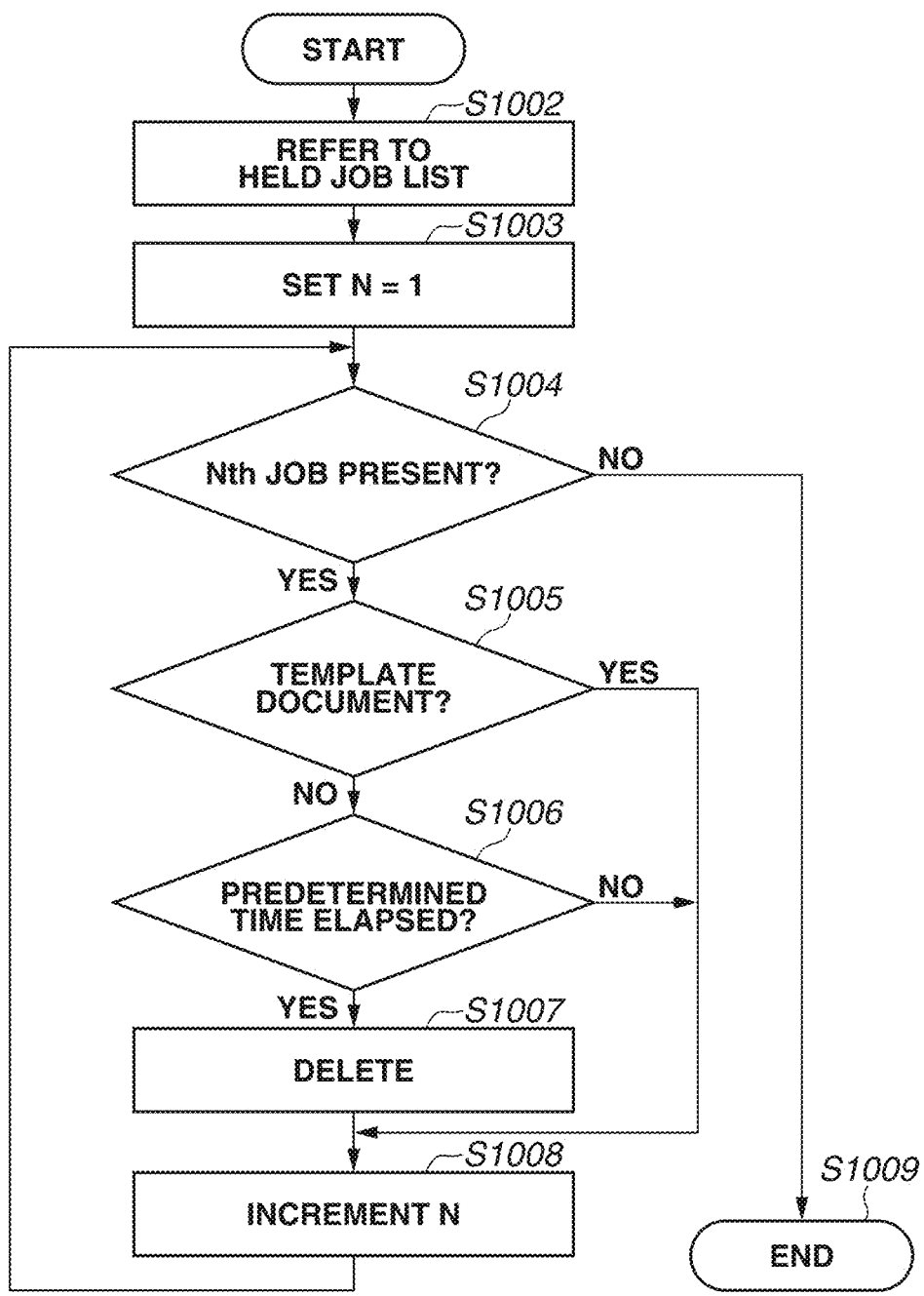
FIG. 10 illustrates processing of deleting the held job in the image forming apparatus.

FIG. 10 is a flowchart illustrating details of processing of automatically deleting the held job stored in the auxiliary storage device 303. In the present exemplary embodiment, the held job is a temporary document to be deleted by the print job management module 502 when the retention period expires, and the template document is a permanent document that can be permanently used and has no retention period. In other words, the template document is excluded from targets for the automatic deletion. In the present exemplary embodiment, the print job management module 502 compares the registration date and time 2301 of the held job list 2300 and the current time, and determines that the retention period of the held job has expired in a case where the current time is past the end of a predetermined time. The print job management module 502 determines the time based on a tinier 313. The predetermined time used for determining the expiration of the retention period may be variable (e.g., one day, two days, three days, or ten days) or fixed, depending on the system. In step S1002, the print job management module 502 refers to the held job list 2300 when determining the expiration of the retention period. Subsequently, in step S1003, the print job management module 502 sets a parameter N for controlling the iterative processing to 1. Subsequently, in step S1004, the print job management module 502 confirms whether an Nth job is present in the held job list 2300. If the Nth job is not present (NO in step S1004), the processing proceeds to step S1009 in which the processing ends.

If the Nth job is present (YES in step S1004), the processing proceeds to step S1005. In step S1005, the print job management module 502 determines whether the job type 2304 is the template document. If the job type 2304 is the template document (YES in step S1005), the processing proceeds to step S1008. In step S1008, the print job management module 502 increments N. If the job type 2304 is not the template document (NO in step S1005), the processing proceeds to step S1006. In step S1006, the print job management module 502 checks the registration date and time 2301 and determines whether the predetermined time has elapsed since the registration date and time 2301. If the predetermined time has elapsed (YES in step S1006), the processing proceeds to step S1007. In step S1007, the print job management module 502 deletes the Nth job. Subsequently, in step S1008, the print job management module 502 increments N. If the predetermined time has not elapsed (NO in step S1006), the processing proceeds to step 1008 to increment N. Upon incrementing N in step S1008, the print job management module 502 performs the processing in step S1004 again.

As described above, the print job received from the information processing terminal 101 is changed in job type to the template document, using the operation unit (the input device 305) of the image forming apparatus 111. This method can eliminate such an inconvenience that, in a case where a user wants to register, as a template document, a held print job that the user is operating during the operation of the held print job at an image forming apparatus, the user has to return to a PC to register the held print job as the template document.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-186100, filed Nov. 6, 2020, which is hereby incorporated by reference herein in its entirety.

What is claimed is:

1. An image forming apparatus comprising:
an operation device;
one or more memories; and
one or more processors that execute a set of instructions to:
receive a print job from an information processing apparatus;
store the received print job in the one or more memories;
control the operation device to display a list of print jobs stored in the one or more memories;
register a print job included in the list in the image forming apparatus, based on a user instruction received by the operation device; and
display a function selection screen including a copy function button to use a copy function of the image forming apparatus, a printing function button to use a printing function of the image forming apparatus, and an execution button for executing the registered print job, the printing function button for causing the list of print jobs to be displayed by selecting the printing function button, the execution button for causing the image forming apparatus to print an image on a sheet based on the registered print job by selecting the execution button displayed in the function selection screen.

2. The image forming apparatus according to claim 1, wherein a print job selected in the list by the user is registrable as a document for sharing or a document for personal use.

3. The image forming apparatus according to claim 1, wherein, in a case where a print job that has been executed once or more is displayed in the list of the stored print jobs, a registration instruction button for registering the print job is further displayed.

4. The image forming apparatus according to claim 1,
wherein the one or more processors further execute the set of instructions to delete, without an instruction from the user, a print job for which a predetermined time has elapsed since storage of the print job in the one or more memories, among the print jobs stored in the one or more memories, and
wherein the registered print job is excluded from targets for the deletion.

5. The image forming apparatus according to claim 1,
wherein the one or more processors further execute the set of instructions to manage a type of a print job stored in the one or more memories, and
wherein, by setting the type of the stored print job designated in the provided screen to a type indicating a document to be subjected to the registration, the print job is registered as the document.

6. The image forming apparatus according to claim 1, wherein the received print job includes at least print data and print settings information.

7. The image forming apparatus according to claim 1, wherein the one or more processors further execute the set of instructions to execute login processing for a user,
wherein the received print job is stored in the one or more memories in association with user information, and
wherein the list of print jobs stored in the one or more memories in association with user information about the user is displayed.

8. A control method for an image forming apparatus that includes one or more memories and an operation device, the control method comprising:
receiving a print job from an information processing apparatus;
storing the received print job in the one or more memories;
controlling the operation device to display a list of print jobs stored in the one or more memories;
registering a print job included in the list in the image forming apparatus, based on a user instruction received by the operation device; and
displaying a function selection screen including a copy function button to use a copy function of the image forming apparatus, a printing function button to use a printing function of the image forming apparatus, and an execution button for executing the registered print job, the printing function button for causing the list of print jobs to be displayed by selecting the printing function button, the execution button for causing the image forming apparatus to print an image on a sheet based on the registered print job by selecting the execution button displayed in the function selection screen.

9. A non-transitory computer readable storage medium on which is stored a computer program for making a computer execute a control method for an image forming apparatus that includes one or more memories and an operation device, the control method comprising:

receiving a print job from an information processing apparatus;

storing the received print job in the one or more memories;

controlling the operation device to display a list of print jobs stored in the one or more memories;

registering a print job included in the list in the image forming apparatus, based on a user instruction received by the operation device; and displaying a function selection screen including a copy function button to use a copy function of the image forming apparatus, a printing function button to use a printing function of the image forming apparatus, and an execution button for executing the registered print job, the printing function button for causing the list of print jobs to be displayed by selecting the printing function button, the execution button for causing the image forming apparatus to print an image on a sheet based on the registered print job by selecting the execution button displayed in the function selection screen.

* * * * *